United States Defensive Publication [19] (H) [11] T953,003

Fritz [43] Dec. 7, 1976

[54] THERMOPLASTIC PAINTABLE POLYOLEFIN COMPOSITION

[75] Inventor: Andrea Fritz, Okemos, Mich.

[73] Assignee: E. I. Du Pont de Nemours and Company, Wilmington, Del.

[21] Appl. No.: 622,428

[22] Filed: Oct. 14, 1975

[51] Int. Cl.[2] ..... C08K 3/04; C08L 9/00

[52] U.S. Cl. ..... 260/42.46; 260/42.47; 260/42.52; 260/897 A

[57] ABSTRACT

A paintable, scratch-resistant, thermoplastic composition containing 40–70% by weight of total polymer of an uncured copolymer of ethylene and higher α-olefin, said copolymer containing at least 67 weight percent ethylene units and having a Mooney viscosity of from 40–80; 30–60% by weight of total polymer of crystalline propylene polymer; and 20–50 parts carbon black per 100 parts of total weight of polymers having an oil absorption number of 50–140 cc's per 100 grams and a mean particle diameter of about 34–77 millimicrons.

23 Claims, No Sheets Drawing,

11 Pages Specification

The file of this unexamined application may be inspected and copies thereof may be purchased (849 O.G. 1221, Apr. 9, 1968).